E. PARMELE & G. CURKENDALL.
Improvement in Cultivators.

No. 129,859.    Patented July 23, 1872.

Witnesses
S. Hannay
D. G. Stuart

Inventor.
Edwin Parmele
George Curkendall
A. McCallum
Atty

UNITED STATES PATENT OFFICE.

EDWIN PARMELE, OF DAVENPORT, IOWA, AND GEORGE CURKENDALL, OF MOLINE, ILL., ASSIGNORS TO DEERE & CO., OF MOLINE, ILL.

IMPROVEMENT IN CULTIVATORS.

Specification forming part of Letters Patent No. 129,859, dated July 23, 1872.

Specification describing certain Improvements in Cultivators, invented by EDWIN PARMELE, of Davenport, in the county of Scott and State of Iowa, and GEORGE CURKENDALL, of Moline, county of Rock Island, State of Illinois.

Our invention relates to improvements in that class of implements which are used for the cultivation of corn and other crops planted in rows, and which, during the early stages of their growth, require frequent and careful tillage. The implement in common use for this purpose is the cultivator, either made to be drawn by one horse, so as to pass between the rows and cultivate one side at a time, or for two horses, with a frame straddling the row, and plows cultivating both sides of the row at once. In either case the tillage has heretofore been accomplished by the use of shovels or plows which penetrate the soil and throw it over in furrows to either or both sides, the shovels next to the row, and working close to it, having a constant tendency to cover up the young and tender plants, and this whether a straight shovel is used or one arranged to throw the furrow toward the plants. This tendency to cover up the plants has induced the use of twisted shovels made to throw the soil from the plants, so as to avoid covering them up when in a tender state; but this is also found objectionable because it removes too much of the soil from around the young roots, exposing them to the sun, and thereby stunting the growth of the young plants. Our invention is designed to obviate these objections to close cultivation of the young plants; and the invention consists in providing a device for thoroughly and deeply stirring the soil close to the plants without throwing to or from the row, and without forming ridges or furrows like the shovels heretofore in use, and in making said device so that it may be readily attached to or removed from the machine and be interchangeable with the ordinary shovels, all as hereinafter more fully set forth.

Figure 1:
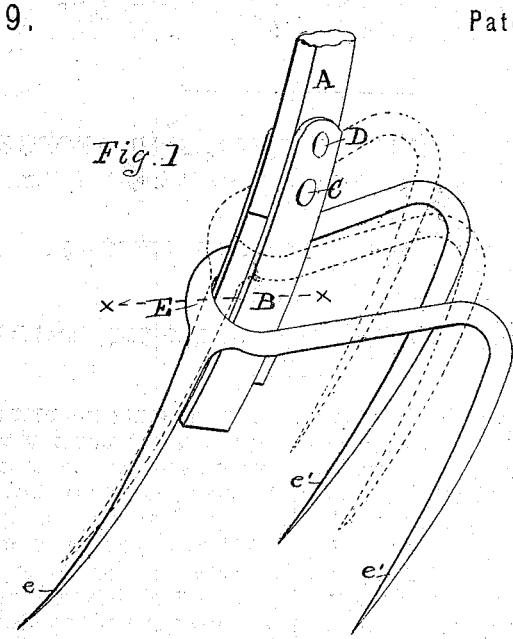
Figure 2:
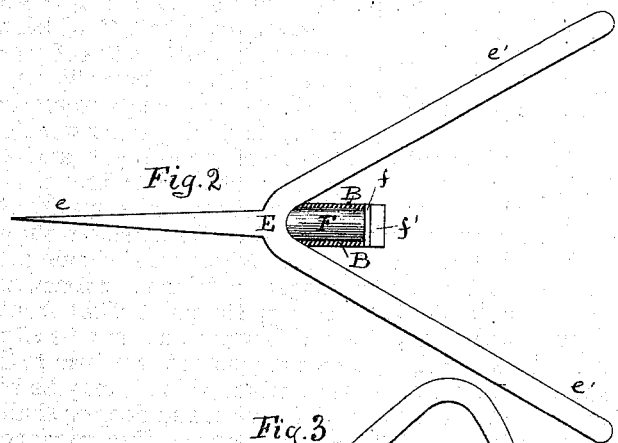
Figure 3:
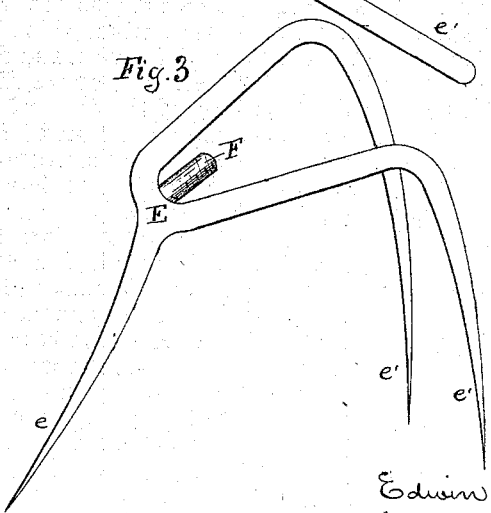

In the accompanying drawing, Figure 1 is a view of a plow-beam and hinged standard having our improved stirring device attached thereto. Fig. 2 is a cross-section on the line $x\,x$, Fig. 1. Fig. 3 is a detached view of the stirring device of modified form.

A represents the rear or curved portion of a metal beam belonging to a walking straddle-row cultivator. B is a plow-standard, constructed of a piece of flat metal bent or doubled so as to form parallel bars connected at the lower end; the upper ends clasp the sides of the beam at its lower end, leaving an open space or slot between the end of the beam and the lower end of the standard. The standard B is hinged or pivoted to the beam by means of a metal pivot-bolt, C, which passes through the beam and both sides of the standard; it is also secured to the beam by means of a wooden pin, D, strong enough to retain the shovel or stirring device in proper working position, but so arranged as to break and allow it to turn on the pivot C when brought in contact with an obstruction, which would otherwise cause it to break. E represents our stirring device, constructed of three long metal teeth or prongs arranged in triangular form, as shown in the drawing; the point of the front prongs $e$ is inclined forward and may be slightly curved in its length, so as to conform to the curve of the standard on which it may be adjusted up and down, so as to run deep or shallow, as desired. The rear prongs $e'$ diverge rearwardly from the top of the forward prong until they are from six to seven and a half or eight inches apart, when they are bent downward with a forward inclination, as shown in Fig. 1 of the drawing, or vertically or with a rearward inclination, as found most desirable and effective. A slight difference in the pitch or inclination will not materially affect the operation of the device. This arrangement of the three deep running prongs, two in rear, with the third one in front, dividing the space equally between them, will cultivate a space of about nine inches or more, and we prefer to have the prongs so arranged; but we do not limit ourselves to the construction shown and described, or to any definite width between the prongs; nor do we limit ourselves to the use of three prongs, though we prefer that number, as a less number will not sufficiently disintegrate the soil, while the use of a greater number would tend to clog and render the device inoperative. F represents a bolt secured to the prong $e$ and passed through the slot or open space between the sides of the standard. A washer, $f$, and nut $f'$ are screwed onto the end of the bolt F, and serve to secure the stirring device to the standard. By loosening this nut $f'$ the stirrer may be adjusted up or down on the standard, as desired, and by tightening the nut it is again secured in the desired position, and by removing the nut the stirrer can be detached from the standard when desired. This is found to be a convenient method of attaching the device to the standard, but the attaching device will of course be varied according as it may be found most convenient to suit the kind of standard, sleeve, or beam to which the stirrer is to be attached.

As shown and described, our stirring device may be attached to either or all of the shovel-standards of a walking or riding straddle-row cultivator.

In operation our device takes the place of the ordinary shovels or plows, and by its use the soil is stirred to as great or to a greater depth than is attainable with the ordinary shovels, thereby eradicating weeds and loosening the soil more effectually without endangering the small plants, and (there being little or no resistance to the draft) with greater ease and rapidity than with shovels or plows. Being under complete control of the driver, the plow-beams with the device attached may be moved to or from the row, and so that the device may cut between the plants in the row without danger of plowing them out, as is the case with the use of shovels when such movement is attempted. The teeth may be made to run deep or shallow, as desired, with the same facility as shovels, vertically adjustable on the standards.

Our device may be used as an attachment to shovel-plows and one-horse cultivators with like good effect, it being designed as an attachment for all implements which are used for the cultivation of crops planted in rows, especially for the cultivation of such crops when the plants are small and tender, and liable to be destroyed either by being covered up in plowing, or left without sufficient soil around the tender roots, as hereinbefore set forth.

*Claims.*

1. As an attachment to cultivators, we claim a stirring device, E, having three or more prongs, arranged in the manner and for the purpose substantially as set forth.

2. The stirring device E, having three or more prongs, arranged as described, in combination with and adjustable up and down upon a curved beam or plow-standard, substantially as and for the purpose specified.

3. The stirring device E, constructed as described, in connection with the plow-beam A and standard B having metal pivot C and wooden pin D, substantially as and for the purpose specified.

EDWIN PARMELE.
GEORGE CURKENDALL.

Witnesses:
JAS. S. MACKENZIE,
FRANK HOLSHUE.